H. O. HALVERSON.
ANIMAL TRAP.
APPLICATION FILED NOV. 8, 1916.
1,251,367.
Patented Dec. 25, 1917.
2 SHEETS—SHEET 1.
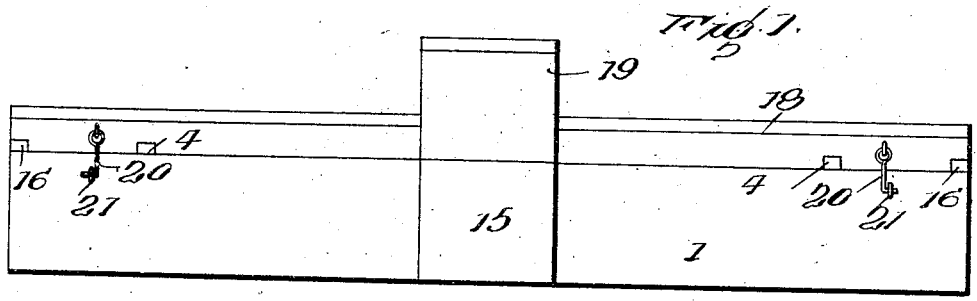
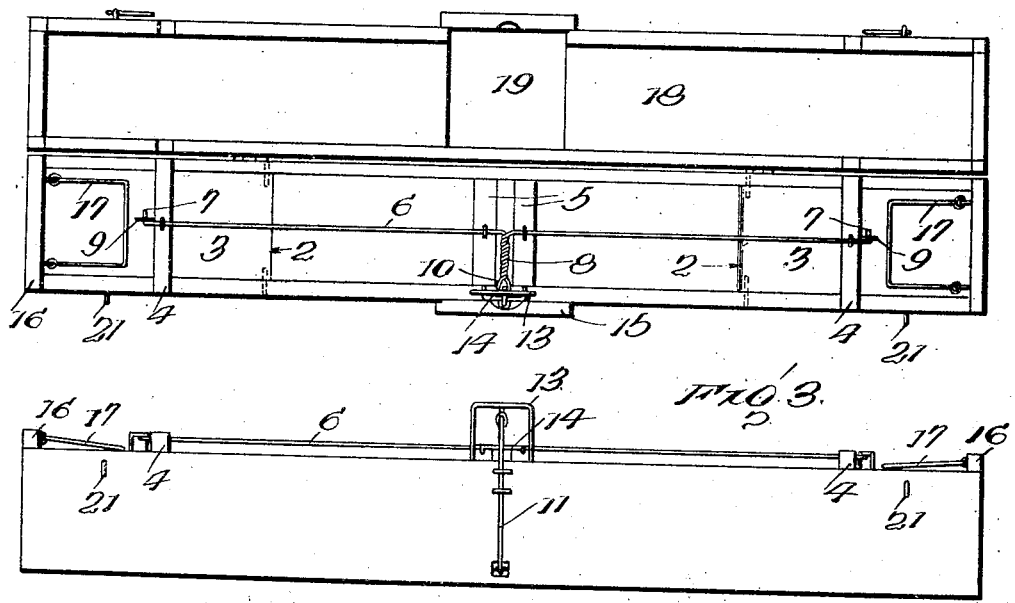
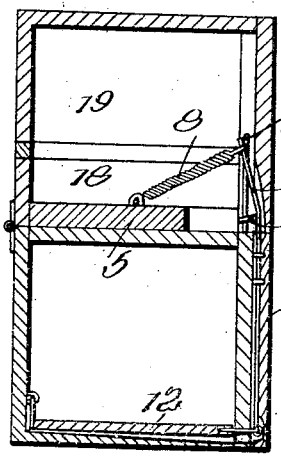
WITNESSES
INVENTOR
Henry O. Halverson
BY
ATTORNEY

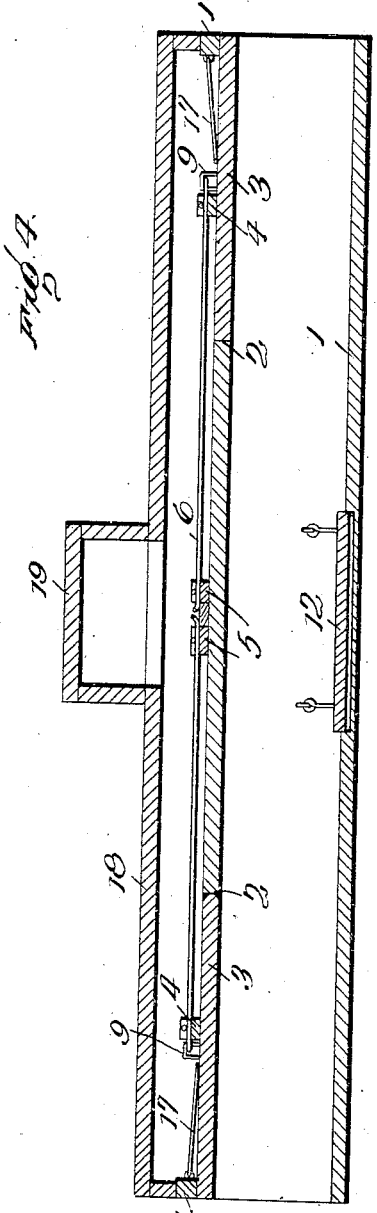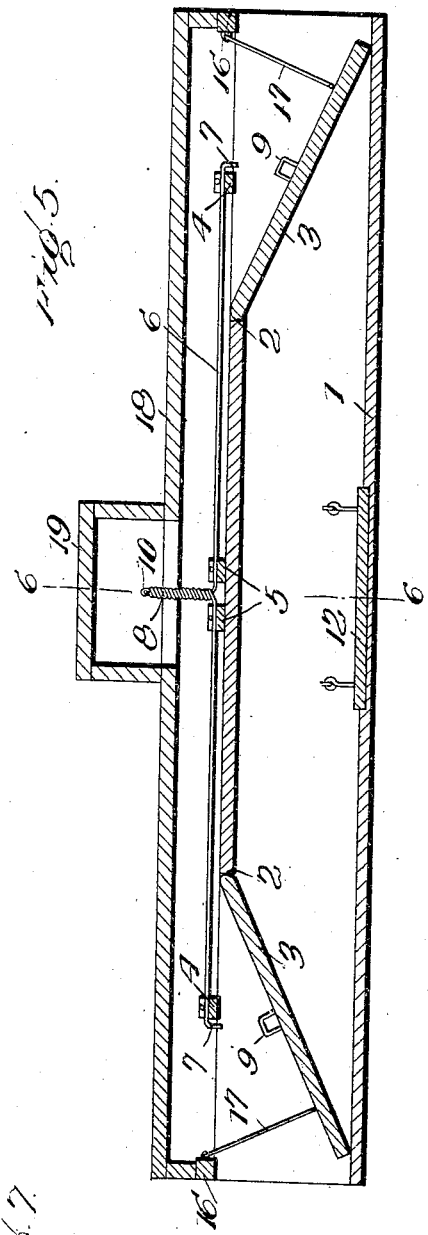

UNITED STATES PATENT OFFICE.

HENRY O. HALVERSON, OF BURR, MINNESOTA.

ANIMAL-TRAP.

1,251,367. Specification of Letters Patent. Patented Dec. 25, 1917.

Application filed November 8, 1916. Serial No. 130,204.

*To all whom it may concern:*

Be it known that I, HENRY O. HALVERSON, a citizen of the United States, residing at Burr, in the county of Yellow Medicine and State of Minnesota, have invented certain new and useful Improvements in Animal-Traps, of which the following is a specification.

This invention has relation to animal traps, and the nature and objects thereof will be readily apparent to those skilled in the art to which it appertains, in the light of the following explanation of the accompanying drawings, illustrating what I now believe to be the preferred embodiment or mechanical expression of my invention from among other forms and arrangements within the spirit thereof, or the scope of the appended claim.

However, an object of the invention is to provide an animal trap having oppositely disposed entrances, trap doors, and operating mechanism therefor, located at each opening, both however, being operable from a single trip mechanism.

In addition to the foregoing, my invention comprehends improvements in the details of construction and arrangement of parts to be hereinafter described and particularly pointed out in the appended claim.

In the accompanying drawings in which similar and corresponding parts are designated by the same characters of reference throughout the several views in which they appear;

Figure 1, is a view in side elevation of a trap constructed after the manner of my invention.

Fig. 2, is a view thereof in plan showing the same with the top swung back.

Fig. 3, is a view of the trap in side elevation with the lid removed.

Fig. 4, is a longitudinal section of the trap showing the same in open position.

Fig. 5, is a view similar to the preceding figure showing the trap however, in released or closed position.

Fig. 6, is a transverse vertical section taken on the line 6—6 of Fig. 5, and

Fig. 7, is a view in end elevation of the trap.

With reference to the drawings, 1 indicates the casing of the trap, in the form of a tube, rectangular in cross section. The top portion of the casing is cutaway at both ends as indicated at 2, and vertically oscillatable doors 3 are hingedly secured at one of their ends adjacent the cutaway ends of the upper portion of the casing. With reference to Fig. 4, of the drawings, it will be noted that in open position of the trap, the trap doors 3 form a substantial prolongation of the top portion of the casing.

Extending transversely of the casing and above each trap door 3 there is provided a cross bar 4, providing in conjunction with similar bars 5 located at the medial portion of the casing, means for supporting bearings for a rock shaft 6 which extends centrally and longitudinally of the casing above the top portion thereof. The ends of the rock shaft 6 are bent at right angles as indicated at 7, while the central portion of the rock shaft between the bearings 5' is provided with an arm 8 which in set position of the trap is adapted to extend oppositely and forwardly at an angle. Each trap door is provided upon its top surface with a staple 9 in which the bent ends 7 of the rock shaft are adapted to engage in set position of the trap to retain the trap doors raised and in a horizontal plane. The rock shaft is retained in such position by reason of the looped extremity 10 of the arm 8 being disposed over the upper terminal of a vertically reciprocable rod 11, movable in a vertical recess in the front wall of the casing, and connected at its lower terminal to a tripping platform 12, hingedly secured at its opposite end to the interior of the rear vertical wall of the casing. The said upper terminal of the rod 11 is guided for movement by means of a vertically extending inverted U-shaped bail 13 and a horizontal bail 14. The front wall of the casing is provided with a cover plate 15, which may be removed to expose the vertically reciprocable rod for adjustment thereof.

At each end of the casing there are provided cross bars 16 extending transversely across the upper portion thereof for supporting door securing bails 17, adapted for vertical oscillation. To protect the mechanism located above the trap casing, a cover 18 is provided for the top of the casing, hingedly secured at the rear longitudinal upper edge thereof, and provided with a central enlargement 19, in which the arm 8 and associated mechanism is received. Hasps 20 may be provided upon the free longitudinal edge of the cover for engaging coacting members 21 secured to the casing to retain the cover in position.

To set the trap, the trap doors 3 are raised so as to dispose them in a horizontal plane, and the rock shaft 6 is rocked to bring its angular ends into engagement with the bails 9 secured to the upper surfaces of the trap doors. The arm 8 of the rock shaft is then secured upon the upper terminal of the rod 11 substantially in the manner as before described, and the trap doors will be retained in said position. Bait is then placed within the trap above the tripping platform 12, and upon depression of the platform by the weight of an animal, the rod 11 is moved downward, thereby withdrawing its extremity from engagement with the arm 8, the rock shaft 6 being then rotated as the trap doors 3 are no longer supported. The trap doors 3 fall by gravity until their lower edges rest upon the bottom of the trap and the bails 17 also fall by gravity and preclude further movement of the trap doors thereby preventing the exit of the animal.

The trap, it will be noted, is devoid of exterior mechanism thereby alaying the suspicions of the animal and presenting an apparently smooth entrance and exit. The only visible mechanism is the movable platform 12 which is not apparent before the animal has entered the trap.

While I have illustrated and described my invention with some degree of particularity, I realize that in practice various alterations thereover may be made, and I therefore reserve the right and privilege of changing the form of the details of construction, and arrangement of the co-related parts without departing from the spirit of the invention, or the scope of the appended claim.

Having thus described my invention what I claim as new and desire to secure by Letters Patent is:

An animal trap including a casing open at opposite ends, trap doors for said ends of the casing, means for releasably retaining the doors in a raised position including a rock shaft extending centrally and longitudinally of the casing over the top portion thereof, an arm extending from the rock shaft at right angles thereto, a loop on the end of the arm, a vertically movable trap door within the casing, a vertically reciprocable rod connected to the trap door, the upper end of the rod extending in proximity to the looped end of the rock shaft, an inverted U-shaped member mounted on the upper portion of the trap through which member the loop may extend, the upper end of the vertically movable rod extended through the loop after the same is inserted through said U-shaped member to prevent movement of the rock shaft, whereby when the trap door is depressed the vertically reciprocable rod will be drawn from the loop said loop withdrawn from the U-shaped member and the rock shaft permitted to rotate to release the doors, and means for retaining the trap doors in depressed position.

In testimony whereof I affix my signature in presence of two witnesses.

HENRY O. HALVERSON.

Witnesses:
 CHARLEY HALVERSON,
 JOHN OLESEN.